(12) United States Patent
Ernst et al.

(10) Patent No.: US 7,958,873 B2
(45) Date of Patent: Jun. 14, 2011

(54) OPEN LOOP BRAYTON CYCLE FOR EGR COOLING

(75) Inventors: Timothy C Ernst, Columbus, IN (US); Christopher R Nelson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 12/152,089

(22) Filed: May 12, 2008

(65) Prior Publication Data
US 2009/0277430 A1 Nov. 12, 2009

(51) Int. Cl.
*F02B 47/08* (2006.01)
*F02B 33/44* (2006.01)
*F02M 25/07* (2006.01)

(52) U.S. Cl. .................... 123/568.12; 60/605.2
(58) Field of Classification Search .......... 123/568.12; 60/605.2, 611
See application file for complete search history.

(56) References Cited

U.S. PATENT DOCUMENTS

| | | | | |
|---|---|---|---|---|
| 4,215,659 A * | 8/1980 | Lowther | ........................ | 123/68 |
| 5,359,855 A * | 11/1994 | Klaue | ............................. | 60/607 |
| 5,635,768 A * | 6/1997 | Birch et al. | ................. | 290/40 C |
| 6,038,860 A * | 3/2000 | Bailey | ........................ | 60/605.2 |
| 6,202,782 B1 * | 3/2001 | Hatanaka | ..................... | 180/301 |
| 6,360,732 B1 * | 3/2002 | Bailey et al. | ............. | 123/568.12 |
| 6,718,768 B2 * | 4/2004 | Shaffer | ........................ | 60/605.1 |
| 6,817,182 B2 * | 11/2004 | Clawson | ........................ | 60/670 |
| 6,889,664 B2 * | 5/2005 | Worth et al. | ................. | 123/494 |
| 6,899,090 B2 * | 5/2005 | Arnold | ..................... | 123/568.12 |
| 6,986,251 B2 * | 1/2006 | Radcliff et al. | ................. | 60/651 |
| 7,062,915 B2 * | 6/2006 | Clawson | ........................ | 60/670 |
| 7,243,495 B2 * | 7/2007 | Whelan et al. | ................ | 60/605.2 |
| 7,451,749 B2 * | 11/2008 | Kardos | ..................... | 123/568.12 |
| 2002/0100461 A1 * | 8/2002 | Braun et al. | ............. | 123/568.12 |
| 2003/0178012 A1 * | 9/2003 | Gielda et al. | .................. | 123/563 |
| 2007/0089717 A1 * | 4/2007 | Saele | ..................... | 123/568.12 |
| 2007/0227472 A1 * | 10/2007 | Takeuchi et al. | ........... | 123/41.19 |
| 2008/0047533 A1 * | 2/2008 | Kardos | ..................... | 123/568.12 |
| 2008/0271703 A1 * | 11/2008 | Armstrong et al. | ........... | 123/263 |

\* cited by examiner

*Primary Examiner* — Stephen K Cronin
*Assistant Examiner* — Sizo B Vilakazi
(74) *Attorney, Agent, or Firm* — Studebaker & Brackett PC; Tim L. Brackett, Jr.; J. Bruce Schelkoph

(57) ABSTRACT

A system for reducing the temperature of waste heat from a waste heat source of a vehicle engine, including an open loop Brayton cycle having a cooler, a compressor, a turbine, and a shaft coupling the compressor to the turbine. Waste heat and compressed air from the compressor flow through the cooler, thereby transferring heat from the waste heat to the compressed air and lowering the temperature of the waste heat. The heated and compressed air is expanded across the turbine, to cause rotation of the shaft, thereby powering rotation of the compressor. Excess power beyond that necessary to drive the compressor may be drawn off through a generator which has its rotor mounted on the same shaft as the compressor and turbine.

22 Claims, 3 Drawing Sheets

OPEN LOOP BRAYTON CYCLE FOR EGR COOLING

FIELD OF THE INVENTION

The present invention generally relates to waste heat recovery systems for engines, and more particularly to waste heat recovery systems including an open loop Brayton cycle having a cooler, a compressor, and a turbine.

BACKGROUND OF THE INVENTION

In general, waste energy recovery systems for use with engines need to operate over a wide range of heat input, which varies depending upon the engine load, while maintaining acceptable performance under conditions of high fuel consumption. Various systems for adjusting system performance over a heat input range are known, such as those described in U.S. Pat. No. 6,986,251, for example.

One function of engine cooling systems is to reduce the temperature of gases provided to the intake manifold of the engine in certain engine designs. Some gasoline and diesel engine systems employ exhaust gas recirculation techniques which re-route a portion of the exhaust gas from the engine, which ordinarily would be expelled by the vehicle exhaust system, back to the engine's intake manifold. This recirculated exhaust gas is mixed with incoming fresh air, and lowers the peak combustion temperature, thereby limiting the generation of harmful emissions, such as nitrogen oxides. However, the high temperature exhaust gas recirculated to the engine increases the temperature of the incoming mix, and therefore increases the demands on the engine's cooling system. This increased demand for heat rejection may require a larger radiator. In vehicular engine systems where space is limited, increasing the size of the radiator is a difficult engineering challenge.

SUMMARY OF THE INVENTION

The present invention provides a system for reducing the temperature of exhaust gas in an exhaust gas recirculation loop of a vehicle's engine. In one embodiment, the system includes an air-air EGR cooler having a first flow path through which exhaust gas from the vehicle engine passes during movement through the exhaust gas recirculation loop, and a second flow path having an inlet and an outlet. A compressor is configured to compress ambient air and provide the compressed air to the inlet of the second flow path. The compressed air flowing through the second flow path draws heat from the exhaust gas flowing through the first flow path. A turbine coupled to the compressor by a shaft is configured to receive and expand the heated compressed air from the outlet of the second flow path, thereby causing rotation of the shaft and powering operation of the compressor.

In some applications of the present invention wherein the waste heat source is from a vehicle engine, cooling system capacity may be reduced. More specifically, recovery of waste heat energy and its conversion to useful work may serve to reduce the amount of heat rejection from that engine system by the amount of energy recovered and usefully converted. Also, cooling methods such as the present invention which utilize other waste heat rejection streams apart from the traditional radiator in-vehicle serve to benefit overall vehicle design by limiting the amount of frontal, cross-sectional area devoted to 'ram-air' cooling techniques and provide the vehicle designer with greater flexibility towards improving vehicle aerodymanic drag, thereby also improving overall vehicle fuel efficiency.

BRIEF DESCRIPTION OF THE DRAWINGS

The above-mentioned and other features of this invention and the manner of obtaining them will become more apparent and the invention itself will be better understood by reference to the following description of embodiments of the present invention taken in conjunction with the accompanying drawings, wherein.

Figure 1:
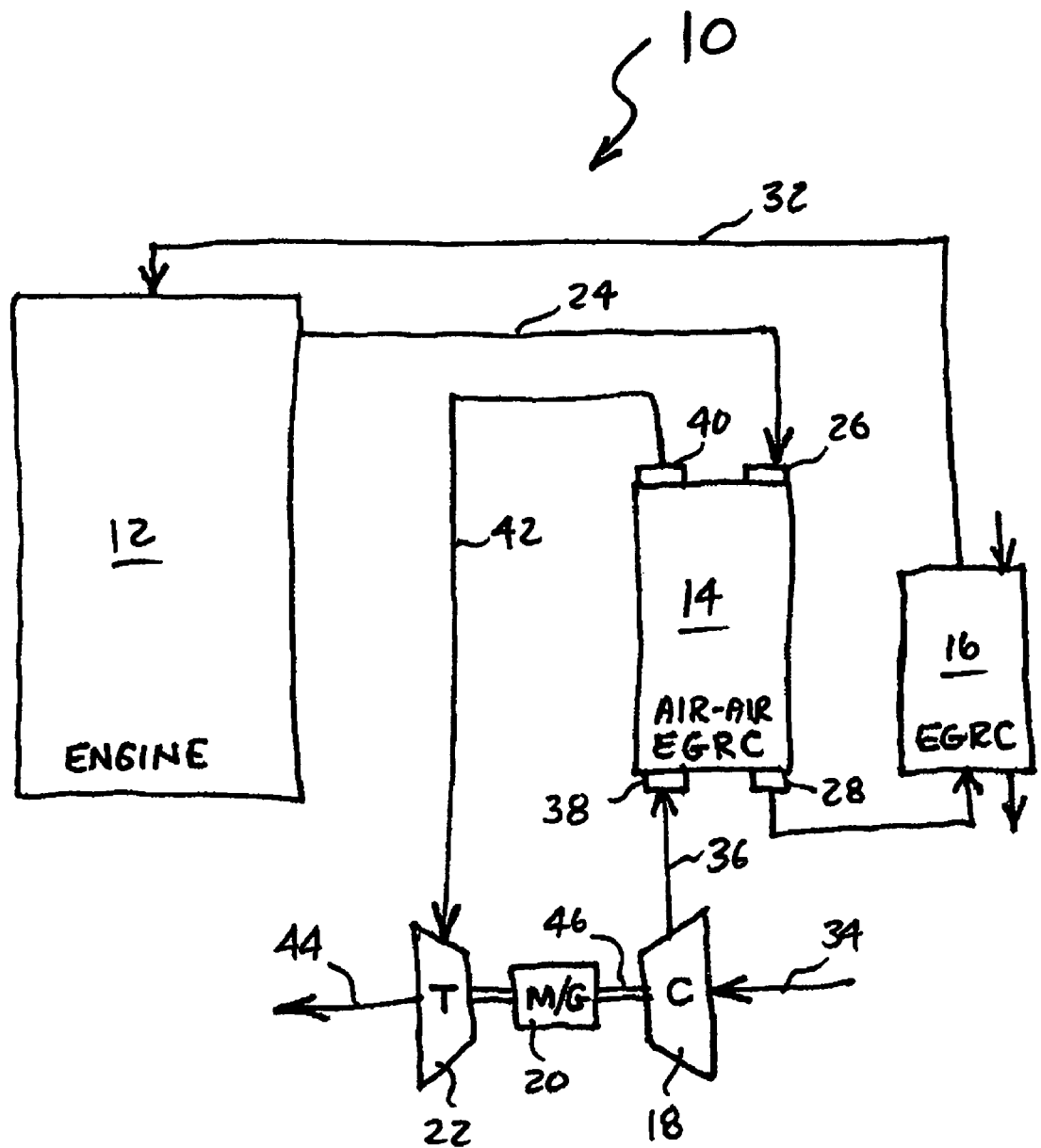
FIG. 1 is a schematic diagram of one embodiment of the present invention.

Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated device and described method and further applications of the principles of the invention, which would normally occur to one skilled in the art to which the invention relates. Moreover, the embodiments were selected for description to enable one of ordinary skill in the art to practice the invention.

Referring now to FIG. 1, a system 10 according to one embodiment of the present invention is depicted as including an engine 12, such as a diesel engine, an air-air EGR cooler 14, a liquid EGR cooler 16, a compressor 18, a motor/generator 20, and a turbine 22. System 10 is described herein for application as a vehicle power system. In general, exhaust gases produced by operation of engine 12 are routed through air-air EGR cooler 14 and liquid EGR cooler 16 before being routed back to the intake manifold (not shown) of engine 12. In this manner, the exhaust gases are cooled to provide more efficient combustion and lower engine emissions. The open loop Brayton cycle formed by the flow path from compressor 18, through air-air EGR cooler 14, and to turbine 22 draws excess heat from the exhaust gas flowing through air-air EGR cooler 14 in the manner described below.

EGR gases are routed from engine 12 to air-air EGR cooler 14 through conduit 24. The exhaust gases pass through a first flow path from input 26 of air-air-EGR cooler 14 to output 28. The gases are then routed from air-air EGR cooler 14 through conduit 30 to liquid EGR cooler 16, which is coupled to the vehicle's cooling system in a conventional manner. From liquid EGR cooler 16, the EGR gases are routed through conduit 32 back to engine 12. Cool air (e.g., ambient air) is routed to compressor 18 through conduit 34. Compressed air from compressor 18 is then routed through conduit 36 to input 38 of air-air EGR cooler 14. The compressed, cool air then flows through a second flow path from input 38 of air-air EGR cooler 14 to output 40. From there, the air flows through conduit 42 to turbine 22. Air discharged from turbine 22 is routed through conduit 44 to the exhaust stack (not shown) of engine 12. It should be understood that compressor 18 and turbine 22 are connected together by a shaft 46 which is coupled to motor/generator 20 in a conventional manner.

In operation, cool air received by compressor 18 is compressed and provided to air-air EGR cooler 14. Heat from the EGR gases flowing through the first flow path of air-air EGR cooler 14 is transferred to the cooler compressed air as it flows through the second flow path of air-air EGR cooler 14. As such, the temperature of the EGR gases decreases and the temperature of the compressed air increases. The high pressure, high temperature air flowing out of air-air EGR cooler 14 through conduit 42 is expanded across turbine 22, and then discharged through conduit 44 to atmosphere. Turbine 22 thereby converts the air from air-air EGR cooler 14 into work which causes rotation of shaft 46. Shaft 46 in turn drives compressor 18 such that, under certain circumstances, operation of turbine 22 fully powers operation of compressor 18. In fact, under some operating conditions, the energy from turbine 22 may be sufficient to power compressor 18 and the generator of motor/generator 20, thereby creating electrical energy for use by other components of the vehicle.

The motor of motor/generator 20 provides power to compressor 18 during engine start up. More specifically, the motor causes the compressor/turbine shaft 46 to rotate, which permits compressor 18 to compress air supplied to air-air EGR cooler 14. That compressed air is heated in the manner described above and supplied to turbine 22, which expands the air and provides sufficient power to operator compressor 18. As such, the operation of compressor 18 and turbine 22 is generally self sustaining after start up.

As should be apparent from the foregoing, the open loop Brayton cycle used in the system of FIG. 1 permits size reduction of liquid EGR cooler 16 because the exhaust gas is being partially cooled before entering liquid EGR cooler 16. This may result in a reduced heat rejection load on the vehicle's radiator, which permits a smaller radiator. As space under the hood is quite limited, a smaller radiator permits more design flexibility.

It should be understood that while FIG. 1 depicts use of the open loop Brayton cycle with an EGR loop, the principles described herein may be readily adapted for use with other waste heat sources of the engine.

Figure 2:
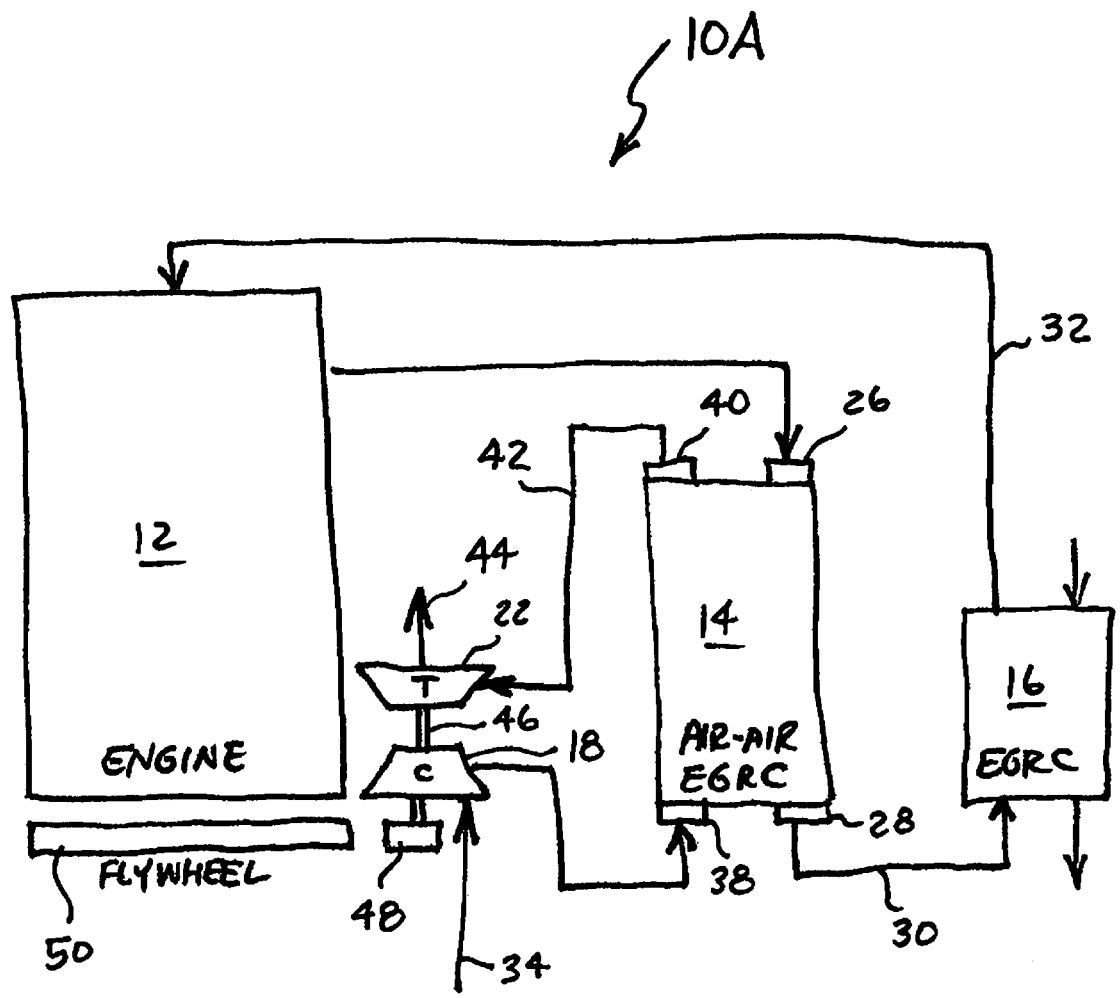
FIG. 2 is a schematic diagram of another embodiment of the present invention.

Referring now to FIG. 2, another embodiment of the invention is shown that is substantially similar to the embodiment of FIG. 1. Like components have been given the same reference designations. In system 10A of FIG. 2, motor/generator 20 has been eliminated and shaft 46 is driven by a gear 48 coupled to the engine flywheel 50. Of course, one of ordinary skill in the art could configure system 10A for mechanical coupling to a variety of different engine locations. The direct mechanical coupling of system 10A eliminates the need to use a motor to start rotation of shaft 46 upon engine start up, which reduces the number of components added to the system, and the associated cost and space requirements. It should be understood also that under conditions permitting the turbine expansion to generate excess power, that excess power may be transferred to flywheel 50, resulting in some overall vehicle energy recovery by increasing the work output of engine 12.

Figure 3:
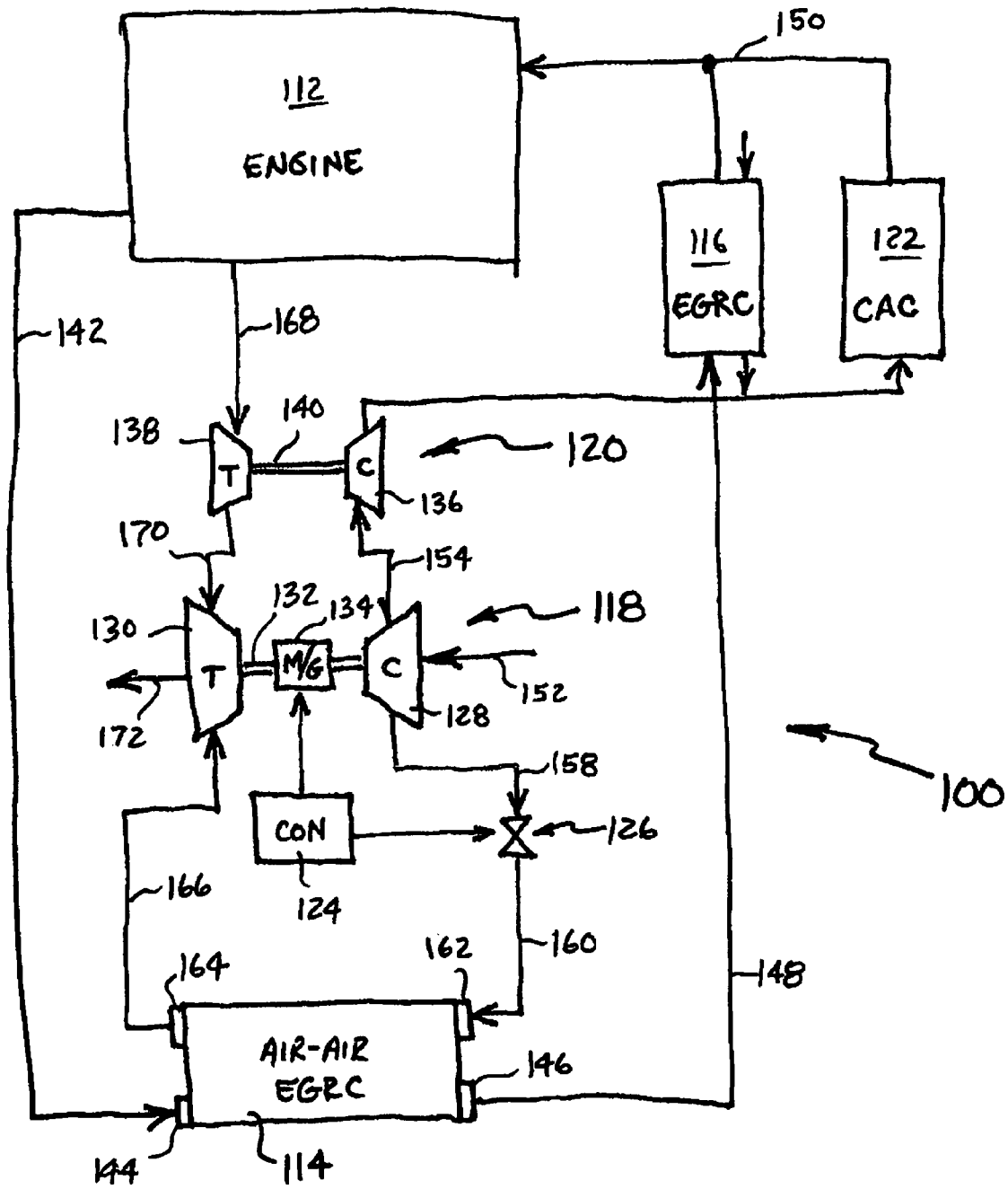
FIG. 3 is a schematic diagram of yet another embodiment of the present invention.

FIG. 3 shows yet another embodiment of the present invention. System 100 generally includes an engine 112, an air-air EGR cooler 114, a liquid EGR cooler 116, a low pressure turbocharger stage 118, a high pressure turbocharger stage 120, a charge cooler 122, a controller 124, and a valve 126. Low pressure turbocharger stage 118 includes a compressor 128 connected to a turbine 130 by a shaft 132, and a motor/generator 134 coupled to shaft 132. High pressure turbocharger stage 120 includes a compressor 136 coupled to a turbine 138 by a shaft 140.

EGR gases are routed from engine 112 to air-air EGR cooler 114 through conduit 142. The exhaust gases pass through a first flow path from input 114 of air-air EGR cooler 114 to output 146. The gases are then routed from air-air EGR cooler 114 through conduit 148 to liquid EGR cooler 116, which is coupled to the vehicle's cooling system in a conventional manner. From liquid EGR cooler 116, the EGR gases are routed through conduit 150 back to engine 112. Ambient air is routed to compressor 128 through conduit 152. Compressed air from compressor 128 is then routed through conduit 154 to compressor 136, where it is further compressed. The high pressure, high temperature air from compressor 136 is routed through conduit 156 to charge cooler 122, the output of which is coupled through conduit 150 to engine 112. Compressed air from compressor 128 is also routed to valve 126 through conduit 158. The output of valve 126 is routed through conduit 160 to input 162 of air-air EGR cooler 114. The compressed, cool air then flows through a second flow path from input 162 of air-air EGR cooler 114 to output 164. From there, the air flows through conduit 166 to turbine 130 of low pressure turbocharger stage 118. Exhaust gas from engine 112 flows through conduit 168 to turbine 138, the output of which is connected to turbine 130 through conduit 170. Air discharged from turbine 130 is routed through conduit 172 to the exhaust stack (not shown) of engine 112.

As should be apparent from the foregoing, system 100 includes a two stage turbocharger (i.e., low pressure turbocharger stage 118 and high pressure turbocharger stage 120) which may already be present as part of the vehicle's engine design because of its performance advantages. According to well understood principles in the art, a two stage turbocharger can enable more efficient engine operation across a wider range of engine operating conditions. The low pressure stage can be designed for efficient operation for one operating mode of engine 112 and the high pressure stage can be designed for efficient operation for another operating mode of engine 112. By controlling the operation of the two stages sequentially, efficient operation may be realized over a wider range of engine operating conditions.

The present invention adapts low pressure turbocharger stage 118 for additional use as part of the open loop Brayton cycle using air-air EGR cooler 114. As in the embodiments described above, implementation of this open loop Brayton cycle reduces the demands on liquid EGR cooler 116, and consequently may reduce the size requirements for the vehicle's radiator.

In operation, ambient air from conduit 152 feeds compressor 128, which supplies compressed air to both compressor 136 through conduit 154 and air-air EGR cooler 114 through conduits 158, 160 and valve 126. At compressor 136, the air is further compressed, then cooled in the standard manner with charge cooler 122 before being mixed with the recirculated exhaust gas and supplied to engine 112. The air supplied to air-air EGR cooler 114 is part of the open loop Brayton cycle. For the initial part of this description, assume valve 126 is always opened. Valve 126 is optional in certain embodiments, and when implemented, may restrict the flow of air to air-air EGR cooler 114 to ensure that sufficient air is routed through high pressure turbocharger stage 120 to engine 112. As the compressed air from compressor 128 travels through the second flow path of air-air EGR cooler 114, it removes heat from the EGR gases passing through the first flow path. The higher temperature air exiting output 164, along with the high pressure exhaust that is routed from engine 112 to turbine 130 through high pressure turbine 138, is then expanded by turbine 130 and expelled through conduit 172.

It should be understood that the air expanded by turbine 130 may power the operation of compressor 128 in the manner described above. As is also described above, excess power may, under certain circumstances, be converted into useful electrical power by the generator of motor/generator 134. It should further be understood, however, that motor/generator 134 may be omitted in certain embodiments of system 100 as the exhaust gas from engine 112 initiates operation of turbines 138, 130, which in turn power compressors 136, 128, respectively. As such, a motor may not be required at engine start up as described above with reference to FIG. 1. In other embodiments where motor/generator 134 is used, the motor may be controlled by controller 124.

Motor/generator 134 of system 100 and motor/generator 20 of system 10 may be useful during transient engine conditions, such as transitions between low load operating conditions and high load operating conditions, when the engine requires high air flow for satisfactory performance. More specifically, and referring to FIG. 3, when engine 112 requires high air flow such as during acceleration or uphill travel of the vehicle, the motor of motor/generator 134 (under control of controller 124) may be activated to cause higher speed rotation of shaft 132, thereby causing compressor 128 to compress more air than it would without the energy from the motor. This additional compressed air is provided to engine 112 in the manner described above. In this manner, motor/generator 134 is used to provide a "boost assist" to system 100. Although activating motor/generator 134 in this boost assist capacity consumes electrical power, the additional air flow enhances engine performance under high load conditions and reduces emissions.

As indicated above, valve 126 depicted in FIG. 3 may also be omitted in certain embodiments of system 100. In general, the primary concern is to provide sufficient air flow to engine 112 as required by the present load on engine 112. As the engine load conditions vary, so too do the air flow requirements. The air flow requirements of engine 112 are monitored by the engine's electronic control module (ECM) (not shown), and are provided to controller 124. As such, when engine 112 requires high air flow as indicated by the ECM, controller 124 may restrict flow through or entirely close valve 126, thereby ensuring that all air flowing from compressor 128 is directed to engine 112.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A system for reducing the temperature of exhaust gas in an exhaust gas recirculation loop of a vehicle's engine, the system including:
    an air-air EGR cooler having separate first and second flow paths, said first flow path positioned to receive exhaust gas from the vehicle engine during movement through the exhaust gas recirculation loop, and said second flow path having an inlet and an outlet;
    a compressor configured to compress ambient air and provide all of the compressed air flowing from the compressor, to the inlet of the second flow path, the compressed air drawing heat from the exhaust gas flowing through the first flow path as the compressed air flows through the second flow path;
    a turbine coupled to the compressor by a shaft and configured to receive the heated compressed air from the outlet of the second flow path, the turbine expanding the heated compressed air to cause rotation of the shaft, thereby rotating the compressor.

2. The system of claim 1, further including a generator coupled to the shaft, the generator converting rotation of the shaft into electrical power.

3. The system of claim 1, further including a motor coupled to the shaft and configured to rotate the shaft to initiate rotation of the compressor upon start up of the engine.

4. The system of claim 1, wherein the shaft is mechanically coupled to the engine such that operation of the engine causes rotation of the shaft.

5. The system of claim 4, further including a gear connected to the shaft and configured to couple with a flywheel connected to the engine, the gear thereby causing rotation of the shaft as a result of operation of the engine.

6. The system of claim 4, wherein expansion of the heated compressed air across the turbine transfers energy to the engine.

7. The system of claim 1, further including a valve configured to receive the compressed air from the compressor and provide the compressed air to the inlet of the second flow path.

8. The system of claim 7, wherein the valve is movable between an opened position and a closed position, and further including a controller coupled to the valve, the controller causing the valve to move toward the closed position in response to increased air flow requirements of the engine.

9. The system of claim 1, further including a motor coupled to the shaft and configured to cause rotation of the shaft in response to increased air flow requirements of the engine.

10. The system of claim 9, wherein the motor is controlled by a controller.

11. The system of claim 1, wherein the compressor and the turbine provide a low pressure turbocharger stage of a two stage turbocharger system for the engine, the second stage turbocharger stage including a high pressure compressor and a high pressure turbine coupled together by a second shaft.

12. The system of claim 11, wherein the compressor provides the compressed air to the high pressure compressor which further compresses the compressed air for delivery to the engine with the recirculated exhaust gas, and the high pressure turbine receives exhaust air from the engine and provides the exhaust gas to the turbine for expansion with the heated compressed air to cause rotation of the shaft.

13. A system for reducing the temperature of waste heat from a waste heat source of a vehicle engine, including:
    an open loop Brayton cycle including a cooler having a first flow path, a second flow path separate from said first flow path, a compressor, a turbine, and a shaft coupling the compressor to the turbine;
    wherein waste heat from the waste heat source flows through the first flow path of the cooler, and ambient air is compressed by the compressor, all of the compressed ambient air from the compressor being passed through the second flow path to reduce the temperature of the waste heat flowing through the first flow path, and expanded across the turbine to cause rotation of the shaft, thereby powering rotation of the compressor.

14. The system of claim 13, further including a generator coupled to the shaft, the generator converting rotation of the shaft into electrical power.

15. The system of claim 13, further including a motor coupled to the shaft and configured to rotate the shaft to initiate rotation of the compressor upon start up of the engine.

16. The system of claim 13, wherein the shaft is mechanically coupled to the engine such that operation of the engine causes rotation of the shaft.

17. The system of claim 13, further including a valve configured to receive the compressed air from the compressor and provide the compressed air to the second flow path.

18. The system of claim 17, further including a controller coupled to the valve, the controller moving the valve to a closed position, thereby preventing the compressed air from reaching the second flow path, in response to increased air flow requirements of the engine.

19. The system of claim 13, further including a motor coupled to the shaft and configured to cause rotation of the shaft in response to increased air flow requirements of the engine.

20. The system of claim 13, wherein compressed air from the compressor is also delivered to a high pressure compressor for delivery to the engine, and exhaust gas from the engine is expanded across a high pressure turbine coupled to the high pressure compressor, delivered to the turbine, and expanded across the turbine along with the compressed air that passes through the second flow path.

21. The system of claim 13, wherein the waste heat source is exhaust gas flowing through an exhaust gas recirculation loop coupled to the engine.

22. A vehicle, including:
an engine;
an exhaust gas recirculation loop coupled to the engine; and
an open loop Brayton cycle coupled to the exhaust gas recirculation loop, the open loop Brayton cycle including
a cooler having a first flow path and a second flow path separate from said first flow path,
a compressor configured to deliver compressed ambient air to the second flow path,
a turbine configured to expand compressed air received from the second flow path, and
a shaft coupling the compressor to the turbine;
wherein exhaust gas in the exhaust gas recirculation loop flows through the first flow path of the cooler, all of the ambient air compressed by the compressor is delivered to the second flow path to reduce the temperature of the exhaust gas, the expansion of the compressed air received by the turbine causing rotation of the shaft and thereby powering rotation of the compressor.

* * * * *